United States Patent Office 3,106,510
Patented Oct. 8, 1963

---

3,106,510
O,O-DIALKYL S-CARBAMOYLMETHYL PHOSPHOROTHIOATES AND PROCESS FOR PREPARING SAME
Karoly Szabo, Pleasantville, N.Y., and John G. Brady, Campbell, Calif., assignors to Stauffer Chemical Company, New York, N.Y., a corporation of Delaware
No Drawing. Filed Apr. 24, 1962, Ser. No. 189,691
7 Claims. (Cl. 167—22)

This invention relates to organophosphorus compounds and in particular to thiophosphoric esters of the type represented by phosphorothioates and phosphorodithioates, in which the S-ester function is an N-substituted carbamoylmethyl grouping. The invention also pertains to biocidal compositions containing as the active component thereof at least one of the aforedescribed compounds.

It has been discovered that the incorporation of an N-substituted carbamoylmethyl grouping as the S-ester in an O,O-dialkyl thiophosphate gives rise to organophosphorus esters exhibiting a high degree of toxicity toward pests of the lower orders, i.e., insects, mites, etc. and the provision of such compounds and their preparation constitutes the primary purpose and object of this invention. Other objects and purposes will be made manifest as the description proceeds.

The organophosphorus esters, as contemplated herein, can be represented by the following formula:

(I)
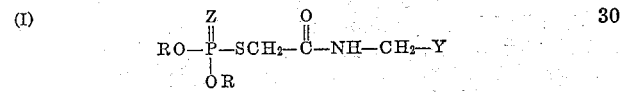

wherein R is a lower alkyl radical such as methyl, ethyl, n-propyl, isobutyl, etc.; Z designates oxygen or sulfur; Y stands for bromine, chlorine, or OH; a phenoxy ring which may be substituted by chlorine, bromine, lower alkyl, lower alkoxyl or nitro; a phenylmercapto ring which may be substituted as above defined for phenoxy; a radical of the formula $-NR_1R_2$ wherein $R_1$ and $R_2$ represent hydrogen or a lower alkyl radical as above defined for R or taken together $R_1$ and $R_2$ can complete a 5 to 6 membered heterocyclic ring system such as pyrrolidine, morpholine or piperidine.

Compounds falling within the ambit of the general formula are structurally depicted below:

Compound 1
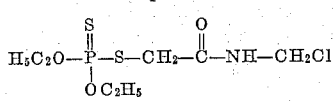

Compound 2
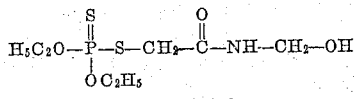

Compound 3
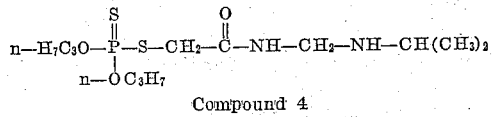

Compound 4
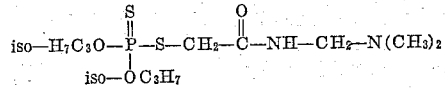

Compound 5
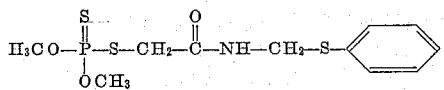

Compound 6
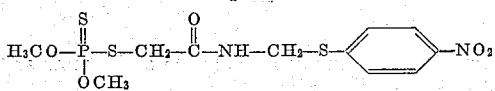

Compound 7
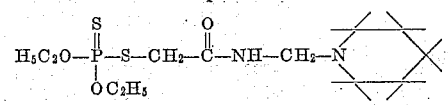

Compound 8
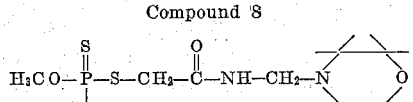

Compound 9
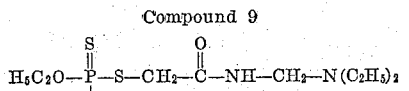

Compound 10
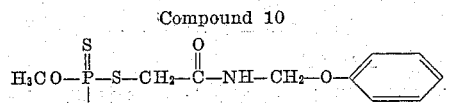

Compound 11
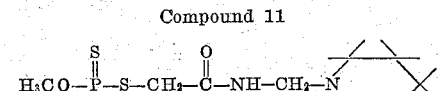

Compound 12
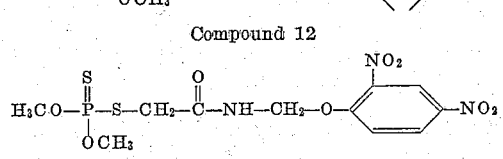

Compound 13
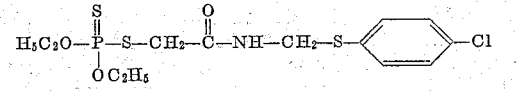

Compound 14
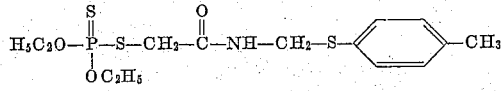

Compound 15
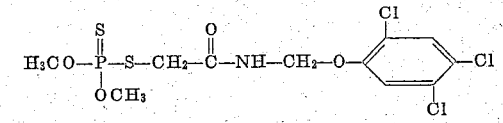

Compound 16
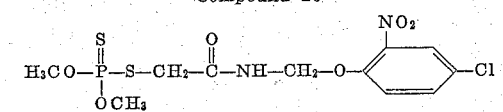

The thiophosphoric esters of this invention, including both the phosphorothioates and the phosphorodithioates, are prepared from an O,O-dialkyl S-carbamylmethyl thiophosphoric acid by replacement of one of the amide hydrogens with the desired substituent.

In some instances, the substituent may be introduced directly into the amide group as illustrated by halo methylation whereby is obtained an S,N-halomethylcarbamoyl ester of the O,O-dialkyl thiophosphoric acid. The aforedescribed reaction can be schematically represented by the following equation:

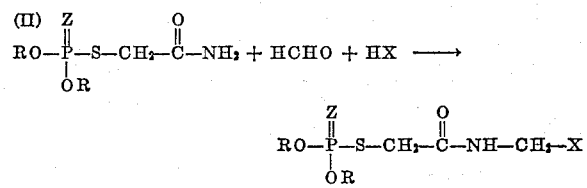

wherein X is halogen such a chlorine or bromine and R and Z have the significance previously defined. The reaction is conveniently carried out in a chlorinated, saturated, hydrocarbon solvent in the presence of dry hydrogen chloride or hydrogen bromide while using paraformaldehyde as the source of formaldehyde.

The O,O-dialkyl S,N-halomethylcarbamylmethyl thiophosphoric ester of the type shown above in Formula II can be further modified by reacting it with the appropriate nucleophile to produce more complex N-substituted carbamoyl thiophosphoric esters. The following equation illustrates this second aspect of the reaction:

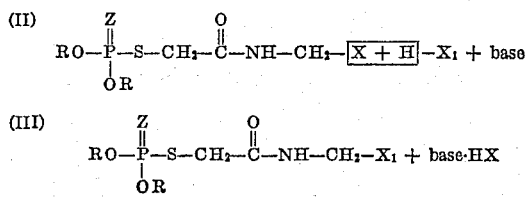

wherein X is chlorine or bromine and $X_1$ has the values defined by the expression Y—X, the terms of which have previously been designated.

In general, it has been our finding that the reaction for obtaining compounds of Formula III is desirably effected by refluxing the N-halomethylcarbamoyl component with the nucleophile in a normally liquid organic solvent and in the presence of a basic condensing agent. Preferable solvent mediums are the normally liquid ketonic and hydroxylic organic solvents such as the lower saturated aliphatic alcohols, e.g. methanol, ethanol, n-propanol, n-butanol, etc., liquid saturated aliphatic ketones as typified by acetone, methylethyl ketone, diethyl ketone, etc., as well as the cellosolves, i.e. organic solvents embodying both hydroxylic and ether functions, and in this connection reference is made to the lower monoalkyl ethers of glycols, e.g. ethylene glycol monoethyl ether, propylene glycol monomethyl ether, trimethylene glycol monomethyl ether, etc. The basic condensing agents with which we have achieved excellent results are the tertiary organic amines, e.g. triethylamine, pyridine, quinoline, and the like, although inorganic bases are also satisfactory, and in this connection, reference is made to the alkali metal carbonates, e.g. sodium carbonate, potassium carbonate, and the like, alkali metal hydroxides, e.g. sodium hydroxide, potassium hydroxide, etc.

Reference is now made to the following examples which are presented for the purpose of illustration only since those skilled in the art will appreciate that variations and departures may be resorted to in practicing the invention without departing from the scope and spirit thereof.

EXAMPLE 1

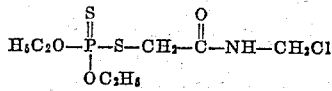

60 g. (0.246 mole) of O,O-diethyl S-carbamoylmethyl phosphorodithioate and 7.38 g. (0.296 mole) of paraformaldehyde were dissolved in 150 ml. of methylene dichloride and dry hydrogen chloride gas then introduced; a spontaneous and exothermic reaction ensued. After about 1 hour, introduction of the gas was discontinued and the solvent removed from the reaction mixture by vacuum distillation. There was obtained a brown, oily residue, the analysis of which corresponded to the above depicted formula.

EXAMPLE 2

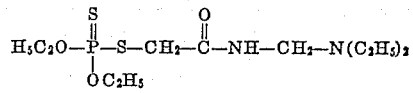

29.1 g. (0.1 mole) of the O,O-diethyl S,N-chloromethylcarbamoyl phosphorodithioate obtained in Example 1 was added gradually to an alcoholic solution of 2 equivalents of diethylamine. After the initial exothermic reaction had subsided, refluxing was continued for 1 hour after which the mixture was poured into water and the organic portion extracted with toluene. The organic extract was dried over anhydrous magnesium sulfate and the solvent removed by vacuum distillation. The light brown oil, the refractive index of which was 1.5282 at 25° C., corresponded in structure to the formula as above given.

EXAMPLE 3

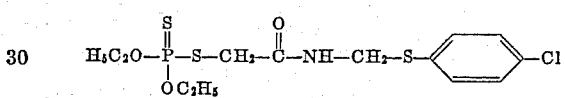

This compound was obtained by reacting 10.8 g. of the intermediate obtained in Example 1 with 5.3 g. of p-chlorothiophenol in benzene using as the basic condensing agent 3.8 g. of triethylamine. After the initial spontaneous reaction had subsided, refluxing was continued for 1 hour and the product isolated in the manner described in the previous examples. The product was obtained in the form of a yellow oil having a refractive index of 1.5920 at 24° C. Analytical data was in consonance with the above depicted structure.

EXAMPLE 4

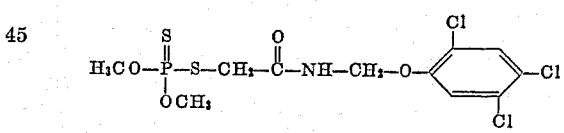

This compound was obtained in accordance with the procedure as above given for Example 3 but substituting trichlorothiophenol for p-chlorothiophenol. There was obtained in a yield of 85% a light yellow oil which analyzed for the above proposed structure.

As stated elsewhere herein, the thiophosphoric esters of this invention are excellent toxicants for use in formulating biocidal compositions which have been found exceptionally effective in combating a variety of pests of the type which fall in the lower orders of classification as exemplified by cockroaches, milkweed bugs, confused flour beetles, house flies, two-spotted mites and the like. It is to be understood that the toxicants of the invention may be used directly on the adult pest organism or, in some instances, applied to the eggs. In either case, the end result in to eradicate or control the pest organism.

As those in the art are well aware, various techniques are available for incorporating the active component or toxicant in suitable pesticidal compositions. Thus, pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthalene, sulfonate, sodium alkyl naphthalene sulfonate, methyl cellulose, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular situation.

Other adjuncts may be resorted to in compounding biocidal formulations based on the herein described organophosphorus esters and, in this connection, reference is made to adhesives, spreaders, activators, fertilizers, and the like.

The preparation of pesticidal compositions incorporating the organophosphorus esters of this invention and the results of testing such compositions are spelled out in the following test procedures:

Acaricidal evaluation test: The two-spotted mite, *Tetranychus telarius* (Linn), is employed in tests for acaricides. Young pinto bean plants are infested with several hundred mites. Dispersions of test compounds are prepared by dissolving 0.1 gram of the toxic material in ten milliliters acetone. This solution is then diluted with water containing 0.015% Vatsol (sodium salt of isopropylnaphthalene sulfonate) and 0.005% Methocel (methylated cellulose) as emulsifiers, the amount of water being sufficient to give concentrations of active ingredient ranging from 0.25% to 0.005%. The test suspensions are then sprayed on the infested pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the columns "2 SM" and "2 SM eggs" on the table below.

Insecticidal evaluation tests: The following insect species were subjected to evaluation tests for insecticides:

(1) American cockroach (AR), *Periplaneta americana* (Linn)
(2) Milkweed bug (MWB), *Oncopeltus fasciatus* (Dallas)
(3) House fly (HF), *Musca domestica* (Linn)

The procedure for insects is similar to the miticidal testing procedure. Test insects are caged in cardboard mailing tubes 3⅛" in diameter and 2⅝" tall. The cages are supplied with cellophane bottoms and screened tops. Ten to twenty-five insects are used per cage. Food and water are supplied in each cage. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to determine living and dead insects. The LD–50 values are calculated using well known procedures.

Data from testing the compounds of the invention are reported in the table below:

*Table*

| Compound | HF, mg. | AR percent | MWB percent | 2 SM percent | 2 SM Eggs, percent | 2 SM Systemic, p.p.m. |
|---|---|---|---|---|---|---|
| 1 | >100 | | | <.05 >.01 | <.05 >.01 | <5 >1 |
| 9 | 10 | .1 | .1 | <.01 >.005 | .01 | 1 |
| 13 | 100 | .1 | | <.05 >.01 | <.05 >.01 | <10 >5 |

We claim:
1. An organophosphorus ester of the formula:

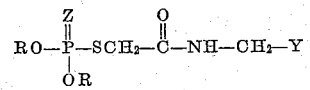

wherein R is a lower alkyl group; Z is selected from the class consisting of oxygen and sulfur; Y is selected from the class consisting of a chlorinated phenoxy group and —NR$_1$R$_2$ wherein R$_1$ and R$_2$ are selected from the class consisting of hydrogen, a lower alkyl radical and taken together R$_1$ and R$_2$ can complete a heterocyclic ring system selected from the class consisting of morpholine, pyrrolidine and piperidine.

2. An organophosphorus ester of the formula:

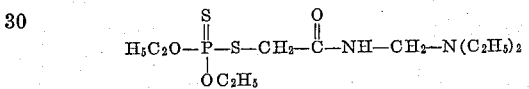

3. An organophosphorus ester of the formula:

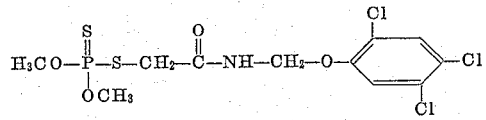

4. A method of preparing organophosphorus esters selected from the group represented by the following general formulae:

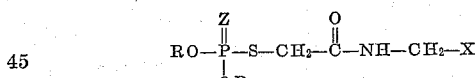

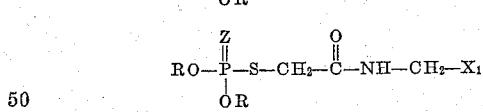

wherein R is a lower alkyl group; Z is selected from the class consisting of oxygen and sulfur; X is selected from the class consisting of chlorine and bromine; X$_1$ is selected from the class consisting of hydroxy, a phenoxy group, a phenylmercapto group and —NR$_1$R$_2$ wherein R$_1$ and R$_2$ are selected from the class consisting of hydrogen, a lower alkyl radical and when taken together R$_1$ and R$_2$ can complete a heterocyclic ring system selected from the class consisting of morpholine, pyrrolidine and piperidine, which comprises forming the organophosphorus ester of the first formula by the halomethylation, in the presence of formaldehyde and a hydrohalic acid, of a lower O,O-dialkyl S-carbamoylmethyl thiophosphoric acid of the formula

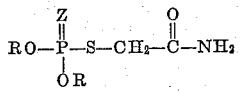

wherein R and Z have the values as above defined, and reacting in the presence of a basic condensing agent the so-obtained halomethylated organophosphorus ester of the first formula with a nucleophile of the formula HX$_1$ wherein X$_1$ has the values as above defined thereby obtaining the organoester of the second formula.

5. A method of killing pests which comprises applying to a pest habitat a biocidally effective amount of an organophosphorus ester of the formula

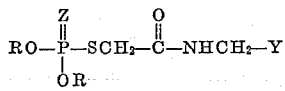

wherein R is a lower alkyl group; Z is selected from the class consisting of oxygen and sulfur; Y is selected from the class consisting of a chlorinated phenoxy group and $-NR_1R_2$ wherein $R_1$ and $R_2$ are selected from the class consisting of hydrogen, a lower alkyl radical and taken together $R_1$ and $R_2$ can complete a heterocyclic ring system selected from the class consisting of morpholine, pyrrolidine and piperidine.

6. A method of killing pests which comprises applying to a pest habitat a biocidally effective amount of an organophosphorus ester of the formula:

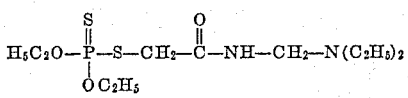

7. A method of killing pests which comprises applying to a pest habitat a biocidally effective amount of an organophosphorus ester of the formula:

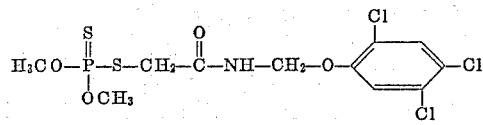

References Cited in the file of this patent
UNITED STATES PATENTS 2,494,283     Cassaday et al. _____ Jan. 10, 1950
3,013,940     Fusco et al. _____ Dec. 19, 1961

OTHER REFERENCES

Fusco et al.: "La Chim. e l'Induistria," vol. 42, No. 4, pp. 337–347 (April 1960).

Hewitt et al.: "J. Econ. Entomol.," vol. 51, pp. 126–131 (April 1958).